Dec. 7, 1965 B. WOOD 3,222,501

SPROCKET HOLE CHECKING SYSTEM

Filed Oct. 2, 1961 2 Sheets-Sheet 1

INVENTOR.
BRAINERD WOOD

BY Henry L. Hanson

ATTORNEY

Dec. 7, 1965 B. WOOD 3,222,501

SPROCKET HOLE CHECKING SYSTEM

Filed Oct. 2, 1961 2 Sheets-Sheet 2

INVENTOR.
BRAINERD WOOD

BY Henry L. Hanson

ATTORNEY 3,222,501
Patented Dec. 7, 1965

3,222,501

SPROCKET HOLE CHECKING SYSTEM

Brainerd Wood, Sudbury, Mass., assignor to Honeywell Inc., a corporation of Delaware Filed Oct. 2, 1961, Ser. No. 142,071
8 Claims. (Cl. 235—61.7)

A general object of the present invention is to provide a new and improved apparatus for checking the operation of a data storage and transfer apparatus. More specifically, the present invention is concerned with a new and improved apparatus for checking the sprocket or clock signals associated with a moving record medium which will ensure that each sprocket signal or clock signal is distinctly indicated at the appropriate time and that no sprocket or clock signal which should be detected is bypassed.

Digital data is frequently stored in various types of movable storage media such as punched paper tape, magnetic tape, electrostatic tape, or the like. The writing or storing of information in such a record medium is generally effected by an appropriate recording process which comprises the making of punched holes in the case of a paper tape, or the making of a magnetic record indicia by a change in flux state of the record medium in the case of a magnetic tape. It is convenient to arrange the data recorded on the medium along the length thereof at spaced intervals which are appropriately related to the ability of the associated writing apparatus to place on the record medium distinct record indicia which will permit the distinct identification of the data to be associated therewith. In the case of the punched paper tape, for example, the data-identifying holes that may be punched along the length of the tape must be positioned or spaced so that there will be destruction of the tape. In other words, the holes punched in the tape must be such that the edges of each hole are related only to that particular hole and there is no overlapping of holes. This ensures that the data cannot subsequently be garbled as the tape is examined for data recovery purposes. Similarly, in connection with magnetic tape, there is a lower limit to the spacing between adjacent magnetic indicia or flux changes that can be placed along the length of the tape, if the data recorded is to be subsequently recovered.

One way to control the placement of the data-identifying indicia on a record medium, insofar as the displacement of adjacent bits is concerned, is to utilize on the record medium appropriate sprocket or clock signals which may be sensed for purposes of synchronizing the operation of either writing or reading apparatus. This may thereby be used to ensure that any writing or reading of information relative to the record medium is directly related to the clock or sprocket signals on the record medium. The punching of the sprocket holes may, in the case of a paper tape, be taking place concurrently with the punching of data in the tape.

In the event that a particular sprocket or clock signal should become obliterated, so as to render the selective recovery of each individual pulse impossible, it is necessary that the operator using the apparatus be appropriately informed of such an error and, if desirable, signals may be emitted for purposes of stopping or otherwise performing a control operation related to the occurrence of such an error. Thus, in the case of a punched paper tape having a sprocket channel punched along the length of the tape, it is essential that during the writing operation of the tape, each and every sprocket hole be sensed in order to ensure that each particular frame of data along the length of the tape associated with a sprocket hole may not be missed and thus not cause an error in a further data processing operation. Further, in the course of the reading of a punched paper tape, in the event that the space between adjacent holes might be reduced so as to destroy the unique identity of each of the adjacent sprocket holes, or in the event that one of the holes should become dirty, it is desirable that the associated equipment be stopped or an appropriate indication be given to an operator.

The present apparatus is directed specifically to apparatus for ensuring that no sprocket or clock signal associated with a moving record associated with either a reading or writing operation can pass undetected or that the sprocket or clock signal has been obliterated in such a manner as to lose its distinct identity. This has been achieved in the present invention by the unique arrangement of a pair of sensing elements which are adapted to sense immediately adjacent sprocket or clock signals as the record medium is being moved relative thereto, and wherein the sensing elements are arranged to function in a slightly time-displaced relationship with respect to each other, and with respect to the adjacent sprocket or clock signals, so as to facilitate a simple but extremely reliable logical check to determine the presence or absence of each sprocket or clock signal as a separate identity.

It is therefor a further more specific object of the present invention to provide a new and improved apparatus for sensing the sprocket or clock pulses associated with a moving record medium wherein a pair of spaced sensing elements are disposed adjacent the record medium and are adapted to sense immediately adjacent sprocket or clock signals from the record medium as it is being moved past the sensing elements.

A still further more specific object of the present invention is to provide a new and improved apparatus for ensuring the absolute detection of errors relative to sprocket or clock signals associated with the record medium wherein two spaced signal sensing elements are placed immediately adjacent the moving record and are adapted to provide output signals which may be logically examined in time sequence to determine that each signal sensed is of the proper form and in the proper time relation relative to the next adjacent signal.

A still further object of the present invention is to provide a new and improved logical apparatus for use in connection with the foregoing objects wherein the operation of the logical circuitry may be selectively interrupted in accordance with the mode of operation of the associated equipment.

Still another more specific object of the invention is to provide a new and improved sprocket or clock signal sensing apparatus employing a pair of sensing elements displaced relative to each other and adapted to sense in a predetermined time sequence immediately adjacent sprocket or clock signals in combination with unique logical error sensing means which will detect at selected times whether or not an error condition is associated with the operation and detection of the sprocket signals.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
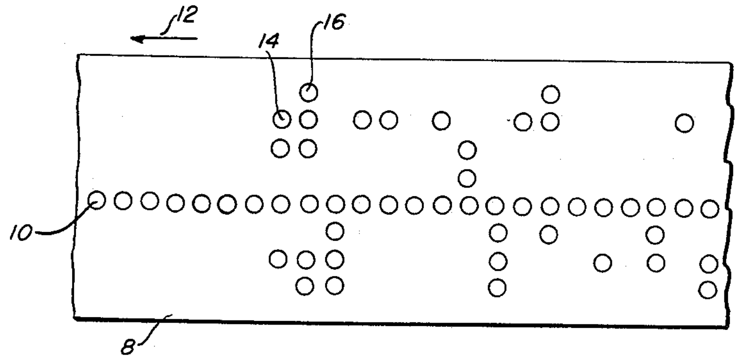
FIGURE 1 illustrates a section of a punched paper tape which may be utilized in accordance with the principles of the invention.

Referring first to FIGURE 1, this figure illustrates a section of a punched paper tape 8 having thereon a series of sprocket or clock holes 10 which extend along the length of the tape. The tape is adapted to be moved relative to an appropriate recording and/or reading head in a predetermined direction, such as indicated by the arrow 12. In addition to the sprocket holes punched along the length of the tape, the tape has punched therein frames of digital data such as at 14 and 16, each frame extending laterally across the tape and each uniquely defining a particular alphabetic character or numeric character. It will be noted that the positioning of the frames 14 and 16 is directly related to the positioning of the sprocket holes on the sprocket channel 10 of the tape.

In the course of either writing data on such paper tape, or reading data therefrom, the tape is adapted to be passed through an appropriate electro-mechanical apparatus and the holes may be either punched therein, in accordance with data to be stored therein, or the holes may be read by suitable reading means, such as photo-electric cells. The transports for moving the tape, as well as the punching and reading mechanisms therefore, are currently manufactured by many companies and the basic functioning of paper tape relative to such apparatus will be well understood by those skilled in the art.

Figure 2:
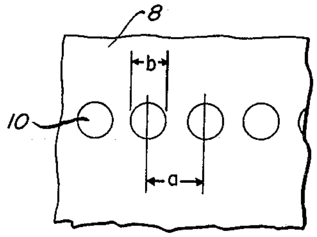
FIGURE 2 illustrates the dimensional details of a representative paper tape.

FIGURE 2 illustrates in enlarged detail typical dimensions which may be associated with a typical type of punched paper tape, particularly insofar as the sprocket holes therein are concerned. In one embodiment of the invention, the sprocket holes were spaced one-tenth of an inch apart between center lines of the respectively adjacent holes. Thus, dimension *a* in FIGURE 2 would be approximately one-tenth inch. The dimension *b*, representing the diameter of each of the respective sprocket holes, was approximately .046 to .048 inch in diameter. These dimensions are of such a size and location that it is possible to photo-electrically sense the position or occurrence of each hole as it passes by a particular reading station, as is essential to the operation of the invention as set forth below.

Figure 3:
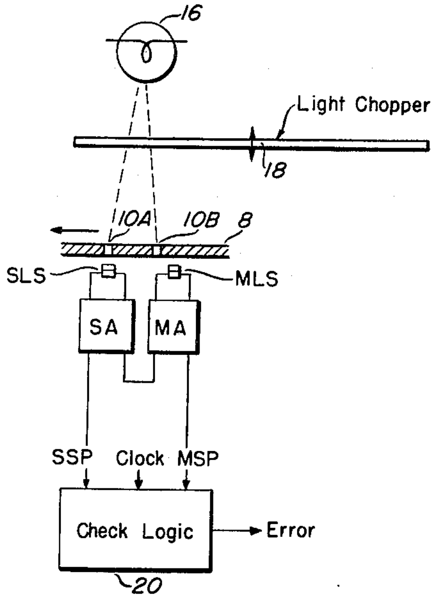
FIGURE 3 is an electro-mechanical showing of the sensing elements of the invention.

Referring next to FIGURE 3, there is here illustrated the basic arrangement of the electro-mechanical elements associated with the present invention. In this figure, there is illustrated in the paper tape 8 having a pair of adjacent sprocket holes 10A and 10B illustrated in cross-section. Positioned to project light through the sprocket holes 10A and 10B is a light source 16. The light path between the source 16 and the sprocket holes 10A and 10B is adapted to be interrupted at a 7.5 kc. rate by way of a light chopper 18. This light chopper may well take the form of a transparent disc having a plurality of light-interrupting lines drawn thereon with the disc being driven by a suitable motor means, not shown.

Positioned immediately under the tape 8, or on the other side thereof with respect to the light source 16, are a pair of light-sensing elements. The light-sensing elements are a main light-sensing element MLS and a secondary light-sensing element SLS. These devices may well be photo-diodes capable of reproducing in electrical form the light signal which may be passed from the source 16 through the sprocket hole 10 adjacent thereto. The output of each of the light-sensing elements, when light is striking the same, will be a 7.5 kc. signal which is applied to the input of an appropriate main amplifier MA or secondary amplifier SA. These amplifiers MA and SA perform an amplifying, rectifying and wave-shaping function such that a step-type signal will be received on the output of the respective amplifiers and shapers as each sprocket hole passes over the respective light-sensing element. Thus, the output of the amplifier MA will be a main synchronizing pulse MSP, while the output of the secondary amplifier will be a secondary synchronization pulse SSP. These two signals, MSP and SSP, along with a separate clock signal, are adapted to be applied to appropriate logical circuitry 20 which will produce an output error signal upon the occurrence of selected sub-signals which indicate that the sprocket holes are not of the proper dimension and size or are not distinctly identifiable.

The actual positioning of the light-sensing elements MLP and SLS will, of course, be dependent upon the positioning of the sprocket holes on the associated paper tape. In the case of the preferred embodiment, where the paper tape employed sprocket holes positioned one-tenth inch apart at the center line, the light-sensing elements were positioned approximately 0.13 inch apart. With this particular positioning of the light-sensing elements, the movement of the paper tape past the sensing elements will produce on the output of the main amplifier and secondary amplifiers, MA and SA respectively, signals as represented at MSP and SSP in FIGURE 4. The clock signal, applied to the input of the check logic circuit, need not be specifically related to the operation of the paper tape reading equipment, but rather is used for synchronizing the operation of the paper tape with respect to an associated data processing equipment. Thus, the clock pulses may well take the form illustrated in FIGURE 4 for the pulses labelled "clock."

The remaining signals illustrated in FIGURE 4 at MSA, MSB, SSA, and SSB are all associated with the logical circuitry to be discussed below in connection with FIGURE 5.

Figure 5:
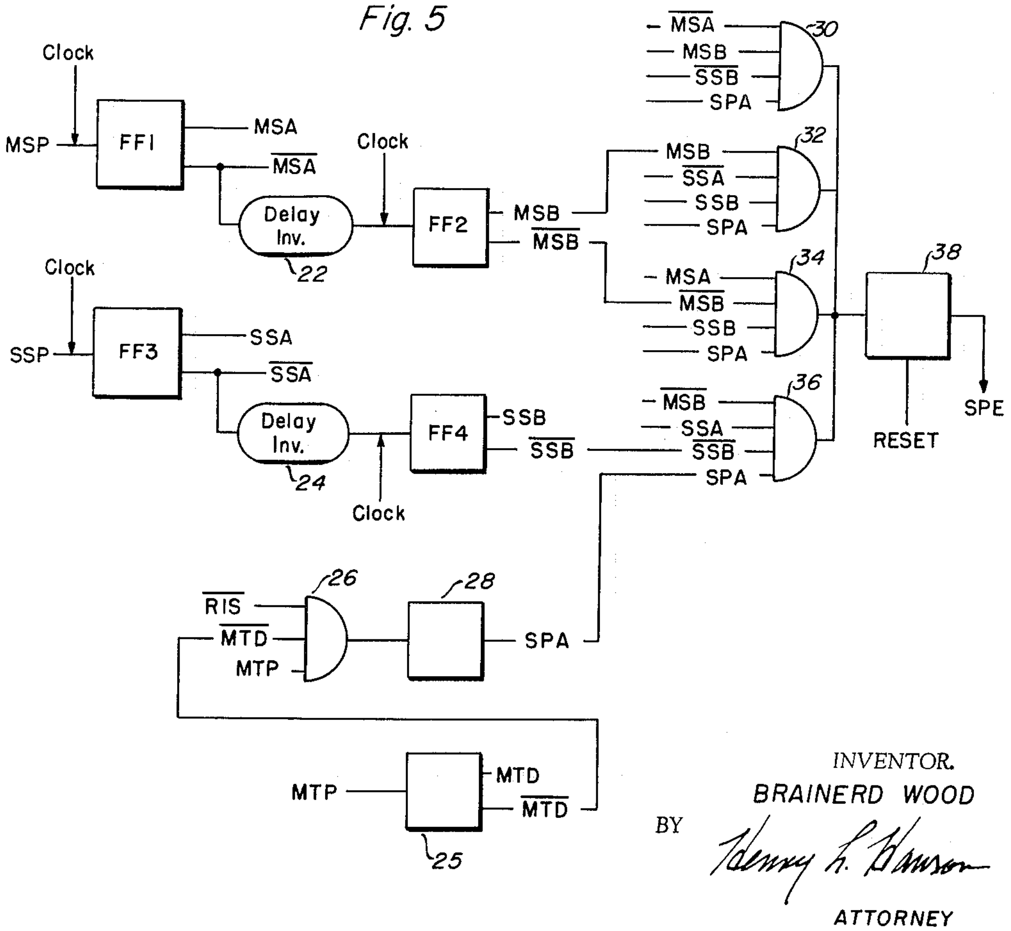
FIGURE 5 is a schematic showing of representative logical circuitry.

Referring next to FIGURE 5, there is here illustrated in diagrammatic detail the logic used in checking the sensing of the sprocket holes and the pulses MSP and SSP. The logical circuit includes four flip-flops or bistable devices FF1–FF4. The input to the flip-flop FF1 is the main synchronizing pulse MSP. The output of the flip-flop will appear in both assertive and negative forms as the signals MSA and $\overline{\text{MSA}}$ respectively and will be stepped or switched from assertive to negative output with the step changes in the MSP signal. The negation ouput $\overline{\text{MSA}}$ is coupled by way of delay inverter 22 to the input of the second flip-flop FF2. The delay inverter serves to provide sufficient time delay to ensure that the clock pulse used in switching the flip-flop FF1 will not be capable of setting the flip-flop FF2. Thus, when a signal is fed through the delay inverter 22 to the input of the flip-flop FF2, the simultaneous appearance of this signal along with the next occurring clock signal will be effective to switch the flip-flop FF2. The output of the flip-flop FF2 will be in the form of an assertion output signal MSB and a negation output signal $\overline{\text{MSB}}$.

The flip-flop FF3 is adapted to be switched by the secondary synchronization pulse SSP when an appropriate clock pulse is received simultaneously with the signal SSP. The output of the flip-flop FF3 will be in both assertive and negative forms and will appear as the secondary signals SSA and $\overline{\text{SSA}}$ respectively. The negative signal on the output of the flip-flop FF3 is adapted to be passed through a delay inverter 24 to the input of the flip-flop FF4. As with the delay inverter 22, the inverter 24 serves to delay the application of the signal coming from the flip-flop FF3 to the input of the flip-flop FF4 sufficiently long to ensure that a clock pulse switching the flip-flop FF3 cannot also switch the flip-flop FF4. The output of the flip-flop FF4 will appear in both assertive and negative form as signal SSB and $\overline{\text{SSB}}$.

Figure 4:
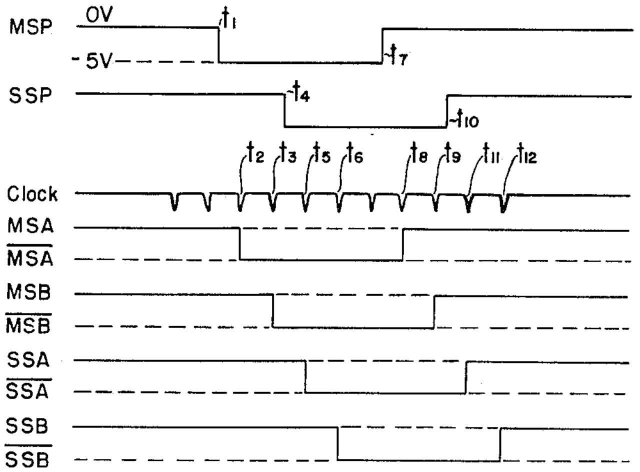
FIGURE 4 illustrates electrical signal waveforms related to the operation of the present apparatus.

The signals represented in FIGURE 4, in one embodiment of the invention, were arranged to operate with a 5-volt swing between zero or ground and a −5 volts. Further, the signals illustrated in FIGURE 4 are all in the assertive form. The negative form of these signals will be a signal having the same time change except that the signal will switch from a —5 volts to zero volts during the time that the assertion signal switches from zero volts to the —5 volt level. The logical circuitry using these signals may be of the type which is sometimes referred to as negative or inverse logic.

Additional control logic is required for purposes of inhibiting the checking functions under certain conditions of operation. Thus, when a paper tape is being run in at the start of any particular reading or writing operation, it is quite possible that the associted tape may not have the desired sprocket holes therein, or that the presence or absence of acceptable sprocket holes at the leading end of a tape is of no consequence insofar as subsequence operation is concerned. Thus, a run-in signal RIS is available to indicate the paper tape is being loaded for purposes of subsequent utilization. Further, following a stopping of the tape during the course of a writing or reading operation, it is essential that the checking function be temporarily inhibited during the time interval immediately following the time that a start signal is received to move the tape. Thus, a move-tape delay signal MTD is provided and this delay will be approximately that delay necessary to ensure that the apparatus is brought up to speed. A further move-tape signal MTP is provided to indicate, by way of a bistable circuit 25, that the tape is acutally moving during a particular monitoring operation. Each of the foregoing control signals is appropriately gated into an AND gate 26. The output of the gate passes through a reshape amplifier 28 to produce the output step signal SPA which is adapted for use in controlling the inhibiting of the checking circuitry.

The logical circuit of FIGURE 5 also includes a plurality of logical gates 30, 32, 34 and 36. Each of these respective gates is an AND gate having three separate inputs from the flip-flops FF1–FF4 in preselected combinations to determine whether or not the apparatus is functioning properly. In addition to the logical inputs from the flip-flops FF1–FF4, a further control input is provided by way of the amplifier 28, and the signal SPA. This latter signal will inhibit the respective AND gates under conditions indicating that a run-in is taking place, a motion of the tape has just been initiated, or the tape has been stopped.

Each of the gating circuits 30, 32, 34 and 36 is arranged to be opened when each of the four input gate legs thereon has a negative 5 volt signal applied thereto by the asosciated input functions representing each particular logical statement.

The output of the respective gates 30, 32, 34 and 36 are all buffered into an input buffer circuit 38 which may take the form of a resettable circuit or a latch circuit which, when once set, will remain set until appropriate reset signals have been applied thereto. The setting of the circuit will indicate the occurrence of a synchronizing signal or sprocket error SPE.

The operation of the apparatus illustrated in FIGURE 5 may best be undertsood by reference to the waveforms associated with FIGURE 4. It will be apparent that since the light-sensing devices MLS and SLS, in FIGURE 3, are displaced from each other by a distance different than the spacing between the sprocket holes 10A and 10B, the outputs from these two sensing elements will be signals that are displaced in time relative to each other. Thus, in FIGURE 4, the signal MSP is of a first value, or at ground potential until time $t_1$ when it switches to a second value which is here assumed to be at —5 v. signal level. When of the second value, the occurrence of the clock signal in synchronism therewith at time $t_2$ will cause the flip-flop FF1 to switch from its first state to a second state, thereby producing the output signal $\overline{\text{MSA}}$. The output signal $\overline{\text{MSA}}$ is fed through the delay inverter 22 to the input of flip-flop FF2. Upon the occurrence of the next clock pulse at time $t_3$, the flip-flop FF2 will switch from the first state to the second state so that the output which will be active will produce the signal $\overline{\text{MSB}}$.

A predetermined time later, the secondary synchronizing pulse SSP from the shaper SA will appear and the signal will be applied to the flip-flop FF3. Assuming this pulse appears at time $t_4$, the flip-flop FF3 will be switched upon the occurrence of the next clock pulse at time $t_5$. A clock pulse later, at time $t_6$, the flip-flop FF4 will be switched so that it is producing the output signal $\overline{\text{SSB}}$.

An analysis of the input logic to the gating elements 30, 32, 34 and 36 will indicate that this logic is arranged so that one or more of the gates will open to produce an output error indication if the change in the sensing state of the light-sensing element MLS should occur at the same time that a similar change takes place at the element SLS. Further, if there should be a failure to switch one of the flip-flops, there would be an error indication.

The functioning of the logic represented on the input gates of the checking circuit may be understood by reference to the waveforms of FIGURE 4 and the inputs to the respective gating circuits of the checking circuitry. The first check that is performed relative to the sensing of the sprocket holes occurs immediately following the change in state of the main light-sensing element MLS from dark to light as represented by the signal MSP. This change in state is represented in the logical circuitry by way of the flip-flops FF1 and FF2. Thus, at time $t_2$, as represented in FIGURE 4, the the MSA output will become active, the output $\overline{\text{MSB}}$ will remain active. At this particular instant, the output SSB must be inactive, if no error condition prevails. Should an error condition prevail such that the signal SSB was active indicating that light was striking the secondary light-sensing element SLS, at a time out of step with the normal sensing of a change at MLS, it is necessary that an error condition be detected. The gate 34 is used for providing this checking logic.

The further check that is made immediately following the first check between the times $t_2$ and $t_3$ is the check that occurs between the times $t_3$ and $t_5$ when the signal SSP changes. At time $t_5$, MSB, under normal operating conditions, will be active, SSA will have been stimulated to be active, and SSB will be inactive. Should MSB be inactive at this time, an error condition prevails. The gate which checks this particular step is the gate 36.

The next operation that is checked by the logical circuitry is the step associated with the return of the MSP pulses from the active state to the inactive state at time $t_7$. This change in state will be represented by the signal differences existing during the time interval $t_8$ and $t_9$ when the signal MSA will switch to the inactive state prior to the time that the signal MSB switches to the inactive state. When MSA becomes inactive, $\overline{\text{MSA}}$ becomes active. However, since the signal SSB is still active, the signal $\overline{\text{SSB}}$ will be inactive, when the system is operating properly. The checking of this particular logical step will be made by way of the gate 30.

A further check made by the present apparatus is the check associated with the switching of the signal SSP from the active state back to the inactive state at time $t_{10}$. Following this particular switching operation, it is desirable that a further check be performed and this will be performed by way of the gate 32. In this regard, noting that after time $t_{12}$, under normal operating conditions, the signal MSB will be inactive, the signal $\overline{\text{SSA}}$ will be active, and the signal SSB will be active. It will be apparent that if the flip-flop FF2 did not switch its output signal so that the signal MSB was inactive before the signal $\overline{\text{SSA}}$ became active, the gate 36 would be open to indicate an error condition.

A further analysis of the logic associated with the inputs of the AND gates 30, 32, 34 and 36 will indicate that should one of the sprocket holes be missed in the course of a scan of the sprocket holes, or if the registration of the holes is not proper, there will not be a corresponding switching taking place in the flip-flops associated therewith. Similarly, if a tear should develop between the sprocket holes so that the identity of the sprocket hole as a distinct element no longer exists, there will be a corresponding failure of the associated flip-flops to switch in the sequence described and illustrated particularly in connection with FIGURE 4. Under these conditions, the logic associated with the gates 30, 32, 34 and 36 will be effective to provide a signal to the circuit 38 indicating an appropriate sprocket error. As an example of the operative features of the invention, consider the operation of gate 34 relative to the above-indicated "inter-hole tear" type of error condition. As seen in FIGURE 5, gate 34 is provided with four input legs, whereat the contemporaneous appearance of —5 volt error signals will induce an error-indicating output. On one input leg a "ready" signal "SPA" is applied to indicate "operating conditions" (that is, tape moving, photo-cells energized, etc., as described above) and is common to all the Error Gates. The other inputs comprise time-indicating (sample-time) signals ($\overline{\text{MSB}}$ and MSA) and "cell-condition-indicating" signals (SSB).

Thus, when NSA is driven to a —5 volt state (see FIGURE 4), this indicates that a hole (e.g. hole $\mathbf{10}_a$) has arrived to initiate the energization of the first photo-transducer MLS, whose amplified output state MSP is driven to —5 volts (time $t_1$); this output being applied to flip-flop FF1 to drive one output thereof, MSA, to a —5 volt state at the onset of the following clock signal ($t_2$). The negation of this MSA signal, $\overline{\text{MSA}}$, is then driven to 0 volt and is applied to switch flip-flop FF2 to drive the $\overline{\text{MSB}}$ output thereof to 0 volt, after being delayed, by stage 22, sufficiently to coincide with the next clock signal in order ($t_3$). Thus, the contemporaneous appearance of a —5 volt condition of signals $\overline{\text{MSB}}$ and MSA at gate 34 indicates that "sampling-time" has arrived; this time being the interval between the second and third clock pulse following the energization of primary cell MLS, since only then will both $\overline{\text{MSB}}$ and MSA be at —5 volts.

At this "sampling time," the error condition of "simultaneous cell energization" is tested for, that is, whether cell SLS is energized, then as well as MLS. Since MSA and $\overline{\text{MSB}}$ are at —5 volts, this would indicate that primary cell MLS has recently been turned "on," while the error-condition of SSB being at —5 volts would also mean (in like manner) that secondary cell SLS was also recently turned "on." Thus, the error condition of "simultaneous energization" is tested for which, among other things, will indicate a tear between sprocket holes (hole too wide, etc.).

In a similar manner, the other error gates 30, 32 and 36 also indicate different error conditions at the photocells at different sampling times. Thus, in this embodiment, the invention will be seen to comprise a simplified testing system whereby, at certain "cell transition" times (e.g. $t_1$, $t_4$, $t_7$ and $t_{10}$), the states of the photocells will be sampled for error-conditions. That is, an energization-transition (turn-on or turn-off) of either photo-transducer (SLS or MLS) may indicate "When" to look at (i.e. sample) the condition (i.e. On or Off) of the other transducer, for instance, by sampling the delayed output thereof.

It will be apparent that the spacing of the light-sensing elements need not be related to adjacent sprocket holes, though the check is most effective in this relationship. In other words, the light-sensing elements could be positioned two or more holes apart provided that the additional displacement is also present to ensure, under proper operating conditions, that the elements do not become active at the same instant.

The foregoing functions relative to each of the gates 30, 32, 34 and 36 may obviously be duplicated or the logic thereof rearranged on another set of logical gates for checking purposes to ensure that a failure condition does not arise in the gating circuits. It will further be apparent that the apparatus described provides a very complete and accurate check which ensures that the sprocket holes associated with the reading of the paper tape are present and that they are properly positioned and of a proper size.

Should the principles of the invention be applied to a magnetic tape apparatus, the change in state of the flux condition on the tape may be used to create the step signals shown in FIGURE 4 at MSP and SSP. As will be apparent, the logical checking circuits of FIGURE 5 may be used to check the timing and location of these changes in flux.

While, in accordance with the provisions of the statutes, there have been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus responsive to the presence of spaced clock indicia on a moving record medium comprising a pair of indicia sensing elements positioned to detect each indicium passed thereby and produce an output signal indicative of each indicium sensed, said sensing elements being positioned apart by a distance different than the distance between the record indicia, and means sensing the outputs of said sensing elements at a predetermined time to produce a control signal if said outputs are both of a predetermined sense at said time, said sensing means comprising a signal gate having signals representative of each of said outputs connected thereto and being adapted to be activated at said predetermined time said sensing means being controlled to sample both of said output asynchronously, at times determined by the change in state of one of said elements.

2. Apparatus for checking the sprocket holes in a moving paper tape being utilized in a data handling apparatus comprising a pair of sprocket hole sensing elements positioned adjacent said tape and spaced apart by a distance different than the distance between adjacent sprocket holes, a pair of signal-shaping circuits connected to the outputs of said sensing elements to produce a step signal output for each element as each sprocket hole passes each one of the respective sensing elements, a first step signal change detection circuit connected to the output of one of the signal-shaping circuits comprising two signal amplifiers each adapted to be switched between one of two output states, means including one of said shaping circuits switching the first of said amplifiers from a first output state to a second output state upon the change of input from the associated shaping circuit, means including the first of said amplifiers switching the second of the signal amplifiers from a first output state to second output state a predetermined time after said first of said amplifiers has been so switched, a second step signal change detection circuit connected to the output of the other of the signal-shaping circuits comprising a third and fourth signal amplifier each of which is adapted to be switched between one of two output states, means including the other of said shaping circuits switching the third amplifier from a first output state to a second output state upon a change of input from the associated shaping circuit, means including the third of said signal amplifiers switching the fourth signal amplifier from a first output state to a second output state, and sprocket error detection means connected to the outputs of all of said amplifiers, said detection means comprising gating means adapted to be opened to indicate an error if, at a selected time, the output state of the respective shaping circuits are the same following a change of one of said outputs of one of said shaping circuits.

3. Apparatus for checking the presence of spaced sprocket holes in a moving paper tape comprising a pair of hole sensing elements positioned to detect each sprocket hole passed thereby and produce an output signal indicative of each hole sensed, said sensing elements being positioned apart by a distance different than the distance between the adjacent sprocket holes, said separation distance being such that said sensing elements may be contemporaneously energized by different one of said holes, and means sensing the outputs of said sensing elements at a predetermined time to produce a control signal if said outputs are both of a predetermined sense, said sensing means being controlled to sample both of said outputs asynchronously, at times determined by the change in state of one of said elements.

4. Apparatus for checking the sprocket holes in a moving paper tape being utilized in a data handling apparatus comprising a modulated light source positioned to project light through at least two immediately adjacent sprocket holes in said tape, a pair of light-sensing elements positioned adjacent said tape and spaced apart by a distance different than the distance between adjacent sprocket holes, a pair of signal-shaping circuits connected to the outputs of said light-sensing elements to produce a step signal output for each element as each sprocket hole passes each one of the respective light-sensing elements, a first step signal change detection circuit connected to the output of one of the signal-shaping circuits comprising two signal amplifiers each adapted to be switched between one of two output states, means including one of said shaping circuits switching the first of said amplifiers from a first output state to a second output state upon the change of input from the associated shaping circuit, means including the first of said amplifiers switching the second of signal amplifiers from a first output state to second output state a predetermined time after said first of said amplifiers has been so switched, a second step signal change detection circuit connected to the output of the other of the signal-shaping circuits comprising a third and fourth signal amplifier each of which is adapted to be switched between one of two output states, means including the other of said shaping circuits switching the third amplifier from a first output state to a second output state upon a change of input from the associated shaping circuit, means including the third of said signal amplifiers switching the fourth signal amplifier from a first output state to a second output state, and sprocket error detection means connected to the outputs of all of said amplifiers, said detection means comprising gating means adapted to be opened to indicate an error if, at a selected time, the output state of the respective shaping circuits are the same following a change of one of said outputs of one of said shaping circuits.

5. Apparatus as set forth in claim 4 wherein said sprocket error detection means comprises gating control means adapted to render said gating means closed when said tape is not moving.

6. Apparatus as set forth in claim 5 wherein said sprocket error detection means comprises gating control means adapted to render said gating means closed during the period said tape is being brought up to operating speed.

7. Apparatus for checking the presence of spaced clock indicia on a moving record medium comprising a pair of indicia sensing elements positioned to detect each indicium passed thereby and produce an output signal indicative of each indicium sensed, said sensing elements being positioned apart by a distance different than the distance between the record indicia said separation distance being less than two normal indicia spacing distances and sufficient to allow said elements to be simultaneously responsive to said indicia, and means sensing the outputs of said sensing elements at a plurality of predetermined times to produce a control signal if said outputs indicate an identity of sense at any one or more of said predetermined times said sensing means being controlled to sample both of said outputs asynchronously, at times determined by the change in state of one of said elements.

8. Apparatus for checking record synchronizing indicia in a moving data storage record being utilized in a data handling apparatus comprising two immediately adjacent pair of indicia sensing elements positioned adjacent said tape and spaced apart by a distance different than the distants between adjacent indicia, a pair of signal-shaping circuits connected to the outputs of said sensing elements to produce a step signal output for each element as each indicium passes each one of the respective sensing elements, a first step signal change detection circuit connected to the output of one of the signal-shaping circuits comprising two signal amplifiers each adapted to be switched between one of two output states, means including one of said shaping circuits switching the first of said amplifiers from a first output state to a second output state upon the change of input from the associated shaping circuit, means including the first of said amplifiers switching the second of the signal amplifiers from a first output state to a second output state a predetermined time after said first of said amplifiers has been so switched, a second step signal change detection circuit connected to the output of the other of the signal-shaping circuits comprising a third and fourth signal amplifier each one of which is adapted to be switched between one of two output states, means including the other of said shaping circuits switching the third amplifier from a first output state to a second output state upon a change of input from the associated shaping circuit, means including the third of said amplifiers switching the fourth signal amplifier from a first output state to a second output state, and sprocket error detection means connected to the outputs of all of said amplifiers, said detection means comprising gating means adapted to be opened to indicate an error if, at a selected time, the output state of the respective shaping circuits are the same following a change of one of said outputs of one of said shaping circuits.

References Cited by the Examiner

UNITED STATES PATENTS

| | | | |
|---|---|---|---|
| 2,482,039 | 9/1949 | Thompson | 250—219 X |
| 2,677,815 | 5/1954 | Brustman | 178—23.1 |
| 2,754,496 | 7/1956 | Embry et al. | 340—149 |
| 2,756,409 | 7/1956 | Lubkin | 340—149 |
| 2,994,783 | 8/1961 | Looschen | 250—219.1 |

ROBERT C. BAILEY, *Primary Examiner.*

IRVING L. SRAGOW, MALCOLM A. MORRISON, *Examiners.*